United States Patent
Miyamoto et al.

[11] Patent Number: 5,867,455
[45] Date of Patent: Feb. 2, 1999

[54] OPTICAL METHOD AND DEVICE FOR IRRADIATING DOMAINS AT PREDETERMINED POSITIONS

[75] Inventors: Harukazu Miyamoto; Hirofumi Sukeda, both of Kodaira; Hideki Saga, Kokubunji, all of Japan

[73] Assignees: Hitachi, Ltd., Tokyo; Hitachi Maxell, Ltd, Osaka, both of Japan

[21] Appl. No.: 915,086

[22] Filed: Aug. 20, 1997

Related U.S. Application Data

[63] Continuation of Ser. No. 350,937, Dec. 7, 1994, abandoned.

[30] Foreign Application Priority Data

Dec. 7, 1993 [JP] Japan ................................. 5-306756

[51] Int. Cl.$^6$ ..................................................... G11B 13/04
[52] U.S. Cl. ............................................ 369/13; 369/275.2
[58] Field of Search ............... 369/112, 13, 275.1–275.4, 369/116

[56] References Cited

U.S. PATENT DOCUMENTS

| | | | |
|---|---|---|---|
| 5,018,119 | 5/1991 | Aratani et al. | 369/13 |
| 5,170,382 | 12/1992 | Yamada et al. | 369/13 |
| 5,170,383 | 12/1992 | Yonezawa et al. | 369/13 |
| 5,297,128 | 3/1994 | Yamaguchi et al. | 369/106 |
| 5,390,162 | 2/1995 | Fukumoto et al. | 369/275.2 |
| 5,398,219 | 3/1995 | Hoh et al. | 369/275.2 |
| 5,400,313 | 3/1995 | Belser et al. | 369/116 |
| 5,410,534 | 4/1995 | Nagata et al. | 369/275.2 |
| 5,420,846 | 5/1995 | Susiyama et al. | 369/275.2 |
| 5,422,865 | 6/1995 | Kutayama et al. | 369/116 |
| 5,428,586 | 6/1995 | Kobayashi et al. | 369/13 |
| 5,448,538 | 9/1995 | Aratani et al. | 369/13 |
| 5,450,381 | 9/1995 | Tsukamura et al. | 369/13 |
| 5,467,337 | 11/1995 | Matsumoto | 369/116 |
| 5,493,545 | 2/1996 | Matsumoto | 369/13 |
| 5,508,982 | 4/1996 | Challener, IV | 369/116 |
| 5,513,165 | 4/1996 | Ide et al. | 369/116 |
| 5,581,535 | 12/1996 | Saito et al. | 369/116 |
| 5,602,814 | 2/1997 | Jaquette et al. | 369/116 |
| 5,656,384 | 8/1997 | Nishimura et al. | 369/13 |
| 5,703,841 | 12/1997 | Hiroki | 369/13 |
| 5,719,829 | 2/1998 | Nishimura et al. | 369/13 |

FOREIGN PATENT DOCUMENTS

| | | |
|---|---|---|
| A-54-95240 | 7/1979 | Japan . |
| A-1-143041 | 6/1989 | Japan . |
| A-3-93056 | 4/1991 | Japan . |
| 3-292632 | 12/1991 | Japan . |

*Primary Examiner*—Nabil Hindi
*Attorney, Agent, or Firm*—Pennie & Edmonds LLP

[57] ABSTRACT

An optical recording medium, optical recording method with use of it, and optical recording device for it comprise at least one magnetic layer on a substrate, the magnetic layer having a temperature Tco at which sizes of domains of the magnetic layer is sharply shrunk or expanded with temperature, thereby being capable of writing and reproducing high-density information formed of smaller domains than an optical spot diameter in a high signal quality.

3 Claims, 10 Drawing Sheets

FIG. 3
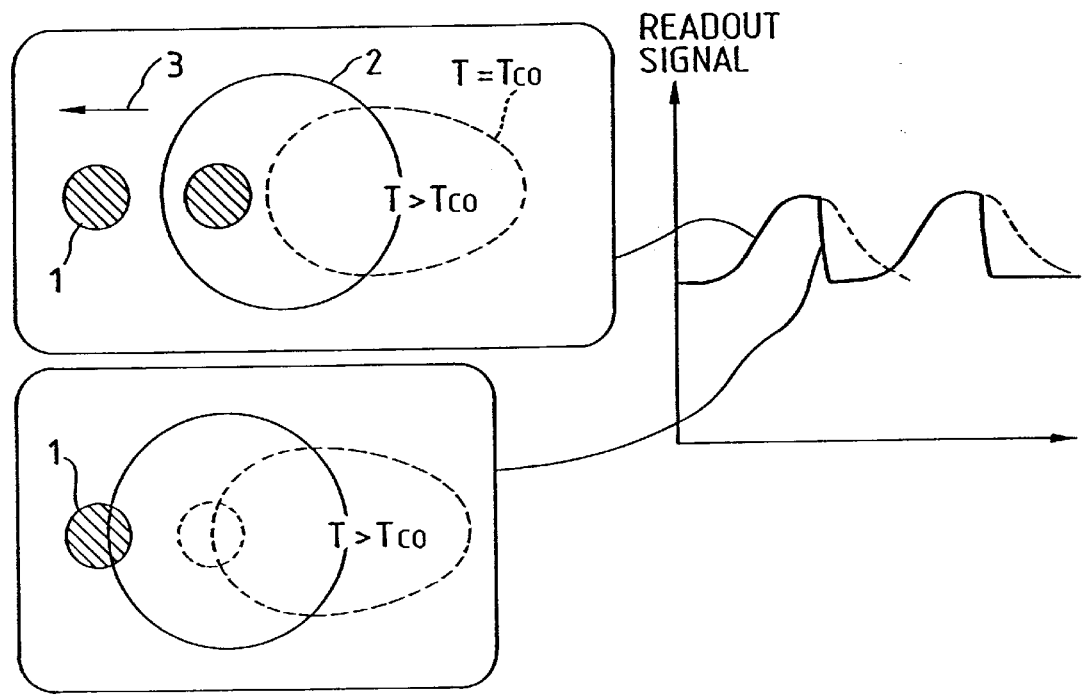
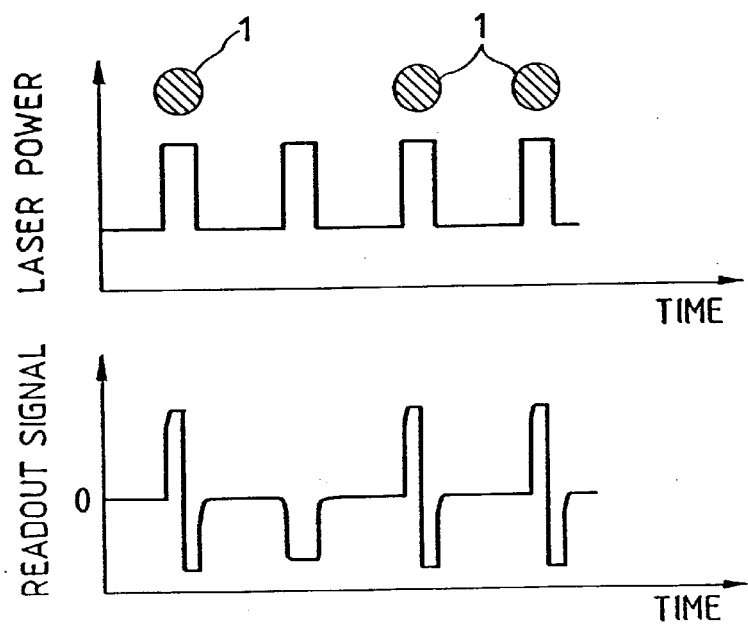
FIG. 4a
FIG. 4b $$d = d_0 + \Delta \cdot n \qquad n$$
$$d' = d_0 + \Delta \cdot n' \qquad n' = 0,1,2\cdots$$
$$d'' = d_0 + \Delta \cdot n'' \qquad n''$$

$$\Delta < D/2$$

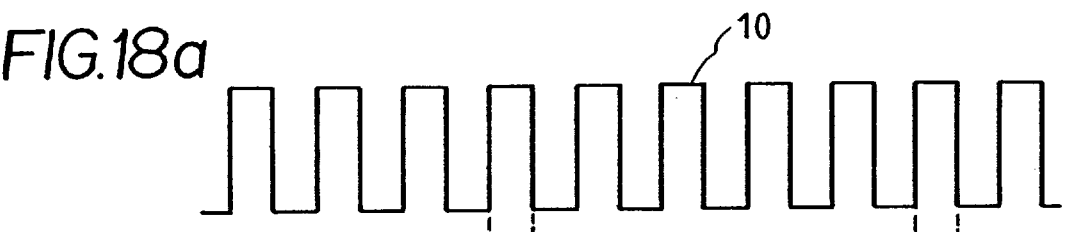
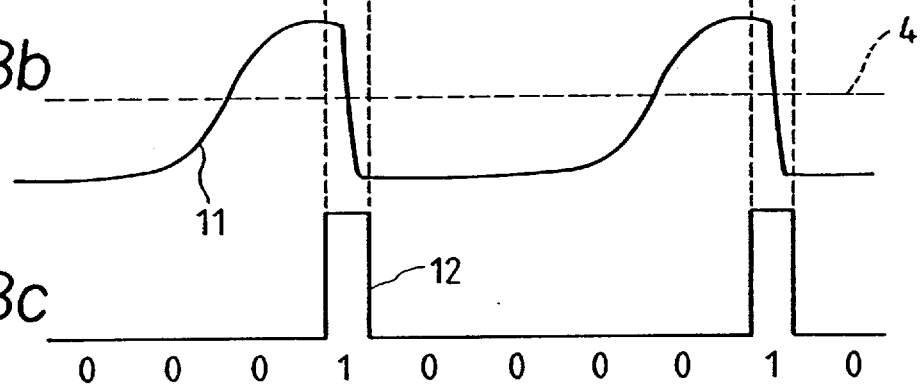
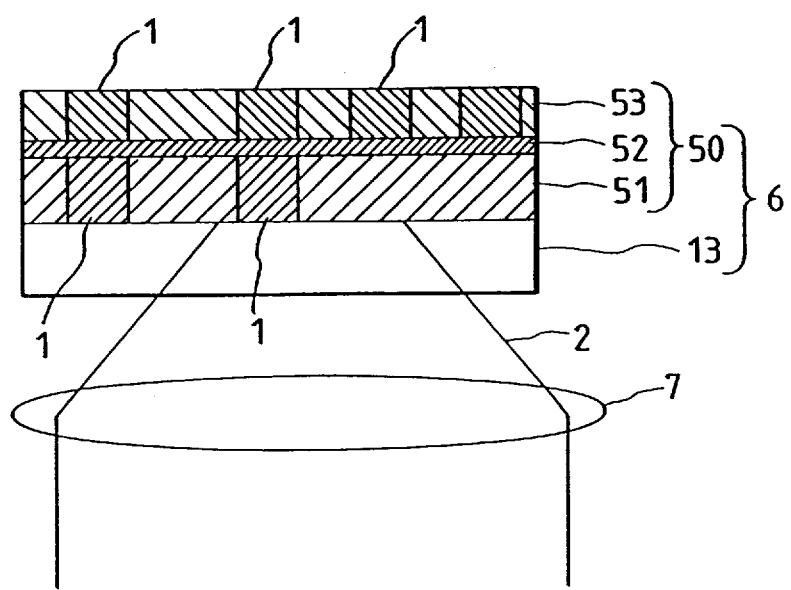

OPTICAL METHOD AND DEVICE FOR IRRADIATING DOMAINS AT PREDETERMINED POSITIONS

This is a continuation of application Ser. No. 08/350,937, filed Dec. 7, 1994, now abandoned.

BACKGROUND OF THE INVENTION

The present invention relates to an optical recording medium, optical readout method with use of magneto-optical effect, and optical recording device for it that are capable of writing and reproducing high-density information formed of smaller domains than an optical spot diameter in a high signal quality.

A prior optical readout method with use of magneto-optical effect, as shown in FIG. 10(a) as an example, detects intensity of and polarization direction of a reflected light from an optical spot irradiated onto a medium 6 to form a readout signal. This method has the disadvantage that as shown in FIG. 10(b), the readout signal output extends around two times radius ro of the optical spot so that two or more marks within the optical spot cannot be resolved. The recording density of the prior method is limited by the diameter ($\lambda$/NA) of the optical spot where $\lambda$ is wavelength of the readout beam and NA is a numerical aperture of a focusing lens 7. If the wavelength is 780 nm, and the numerical aperture is 0.55, for example, the diameter of the optical spot is 1.4 $\mu$m, and the size of the minimum reproducible mark is a half of it, or is limited to around 0.7 $\mu$m.

A prior method of reproducing smaller mark than the diameter of the optical spot were proposed in U.S. Pat. No. 5,018,119 or the like. This prior art, as shown in FIG. 11, uses a magnetooptical recording medium having three or more magnetic layers. A part of the optical spot 2 is masked to make magnetization of the magnetic layer on the light irradiation side uniform in a single direction so that it cannot be seen as signal, thereby reproducing smaller domain 1 than the optical spot 2 at a high resolution. The masking area is formed at an area of the medium that is heated to higher temperature than a masking temperature Tm by the readout light beam.

As an example, a method of recording smaller mark than the diameter of the optical spot is as follows.

(1) Intensity of a light beam to be irradiated is controlled so that only the temperature at a center of an optical spot can exceed right over a recording temperature. This can limit a recording area to a high-temperature area (minute area) of the center of the light to form smaller mark than the optical spot.

(2) The light beam is irradiated to the medium to increase the temperature of the medium to the recording temperature and at the same time, a magnetic field is modulated at a high speed to form minute domains. This method was proposed, for example, in the Japanese Patent Laid-Open No. 54-95240.

The above-mentioned prior art have the disadvantage that the signal area is limited to the part of the optical spot so that the readout output is decreased. As a result, high S/N cannot be obtained. The above-mentioned prior arts also have the disadvantage that the domain must be formed very small to record at a high density.

SUMMARY OF THE INVENTION

In view of solving the foregoing problems of the prior arts, it is an object of the present invention to provide an optical recording medium, an optical readout method, and an optical recording device that are capable of writing and reproducing information at a high density.

In order to accomplish the above-mentioned object, the present invention makes use of an optical recording medium having a magnetic layer having a characteristic that a size of a domain of the magnetic layer is sharply shrunk or expanded at a temperature Tco. That is, the magnetic layer has the characteristic that as shown in FIG. 2, a domain diameter Do at room temperature is sharply shrunk when the temperature is increased to the temperature Tco, or that as shown in FIG. 5, the domain diameter of 0 at room temperature is sharply expanded to Do when the temperature is increased to the temperature Tco, or that a domain of diameter Do is suddenly created when the temperature is increased to the temperature Tco.

In order to stabilize the domain diameter Do to make the size of domain or presence or absence of the above-mentioned shrinking or expanding incident correspond to recording information, the optical recording medium to be used should have at least one magneto-optical recording layer in addition to the magnetic layer or have the magnetic layer having areas therein different in magnetic characteristics in advance as recorded information.

As an example, a multilayered optical recording medium 6 shown in FIG. 19 should be used. This medium has not only a first magnetic layer 51 having a domain diameter changed with temperature, but also a third magnetic layer 53 for holding the recording information as presence or absence of a domain 1 of diameter Do. A second magnetic layer 52 is put in to control a bonding force between the first magnetic layer 51 and the third magnetic layer 53, but not always needed. To write the recording information in the third magnetic layer 53, we should use the same method as described in the above BACKGROUND OF THE INVENTION. In FIG. 19, the domain 1 in the third magnetic layer 53 is made to correspond to the recording information. Alternatively, it is possible to use the first layer for the magnetic layer and make a concave and convex of a substrate 13 or magnetic difference of the magnetic layer itself correspond to the recording information. This method is particularly effective in a read only memory (ROM).

The optical recording medium of the present invention can accomplish sharp change rate of the readout signal to increase the signal quality (S/N) at a high frequency (high density) in a way that the optical recording medium has the readout beam irradiated thereto to locally increase the temperature of the magnetic layer to around Tco to change the domain shape and the change of the polarization state of the reflected light with the shape change is detected to reproduce the information. In this case, it is possible to selectively reproduce only the portion of the domain shape changing in the optical spot. This means that smaller domain than the optical spot diameter can be reproduced at a high resolution.

If time of change of the readout signal can be detected, detection accuracy of the change time can be increased. High detection accuracy of the instance of the readout signal means that the mark position and length can be detected more accurately, or that readout can be made from high-density recording.

Also, the optical recording method of the present invention can stably detect smaller mark than the beam spot with superior high-frequency characteristics by detecting the instance of sharp change of the readout signal that meets the following relationship $$\Delta T < r_o / v$$

where ΔT is the change rise or fall time of the readout signal, $r_o$ is a radius of the readout beam spot, and v is a relative movement speed between the readout beam spot and the optical recording medium (FIGS. 1 and 6).

If the change of the polarization state (polarization angle) of the reflected light due to the magneto-optical effects, such as Kerr rotation, is detected as the readout signal, the temperature of the magnetic layer heated by the readout light is increased to Tco when the optical spot 2 reaches the recording domain 1 of diameter D while the optical spot moves by ΔT×v in a direction 3 of the optical spot 2 as shown in FIG. 3. Size of the domain 1 then is sharply shrunk or expanded. This changes the readout signal sharply. The change time is far shorter than that of the prior recording media. That is, the optical recording method of the present invention can change the readout signal at a very high speed, while the prior methods take a time in which the optical spot of diameter 2ro passes over the domain until the readout signal changes over. The change of the readout signal in FIG. 1 corresponds to the sharp shrink of the domain, or to the medium of the characteristic in FIG. 2, while the change of the readout signal in FIG. 6 corresponds to the sharp expansion of the domain, or to the medium of the characteristic in FIG. 5.

Further, the optical recording method of the present invention can stably detect more precise mark position or size at higher accuracy by detecting an instance of sharp change of the readout signal that meets the following relationship $$\Delta T < D/v$$

where ΔT is the change time of the readout signal, D is size of the recording marks to be reproduced, and v is a relative movement speed between the readout beam spot and the optical recording medium.

The prior art has the disadvantage that as shown in FIG. 11, the domain 1 is progressively deleted from an end thereof at the time when the domain 1 enters an area of T>Tm. For the reason, the signal change takes a time ΔT' (=D/V) that the optical spot moves over the diameter of the recording domain. On the other hand, the optical recording method of the present invention has the advantage that as shown in FIG. 3, the size of the whole domain 1 shrinks sharply when an average temperature T of the whole domain 1 becomes T>Tco. The domain 1 vanishes suddenly. The change ΔT of the readout signal of the present invention, therefore, is shorter and sharper than the prior change ΔT'.

In the method that the optical recording medium has a pulse readout beam irradiated thereto and that an polarization state of a reflected light of the readout beam is detected as a readout signal, information can reproduced by detecting an instance of sharp change of the readout signal that meets the following relationship $$\Delta T < tp$$

where ΔT is the change time of the readout signal and tp is length of pulse of the readout beam. An example of the method is shown in FIG. 4.

In the method, the laser beam is irradiated to the magnetic layer at certain intervals like pulse to heat to change the diameter of the domain 1. As shown in FIG. 4, the laser has a first power level at spaced intervals corresponding to predetermined positions where domains may be found, and a second power level lower than the first power level between the spaced intervals. As the readout signal is sharply changed only when the domain exists, presence or absence of the recording domain can be detected by detecting the sharp change. It is therefore possible to detect the recording domain at high speed even if the optical spot does not move relatively to the medium. The method is suitable to an optical card. That is, as it is difficult to (rotate) the medium of card type at a high speed, we use the method that position of the optical spot should be moved to reproduce. In this case, as the optical spot is not always scanned continuously, it is preferable to use the method that the optical spot should be pulsated to irradiate to the portion from which information is reproduced.

Further more, the recorded information can be reproduced in a way that recording marks of virtually identical shape are formed at different distances as the recorded information and the distances between the recording marks are detected as the sharp change of time of the readout signal. The distance between the marks, as shown in FIG. 7, may be modulated by two or more discrete values, and step width of the modulation may be made narrower than a half of the diameter of the recording mark. Let the distance between the marks be denoted by d. The modulation is made as $$d = d_o + \Delta \cdot n$$

where $d_o$ is the shortest mark interval, Δ is the step width, and n is larger integer than 0. Δ is $$\Delta < D/2$$

where D is the mark diameter.

As described above, the recording marks should be shaped virtually identical and more preferably should be made virtually circle to make the sharp change of the readout signal occur on all the marks uniformly, thereby being capable of reproducing information stably. Also, the step width of the modulation should be made narrower than the half (radius) of the diameter of the mark to obtain high recording density without recording small marks.

Further, higher recording density can be obtained in a way that information should be recorded on the optical recording medium by changing both length of the recording marks and distance between the recording marks and by detecting instances of sharp changes of the readout signal corresponding to a leading edge of any of the recording marks and a trailing edge of the recording mark.

Alternatively, information can be recorded and reproduced in a way that a distance between the leading edges of the two adjacent recording marks and another distance between the trailing edges of the recording marks are recorded as different, independent information, the distances are modulated by two or more discrete values, and a step width of the modulation corresponding to the leading edge is different from the one corresponding to the trailing edge.

An example is shown in FIG. 12. Change of the readout signal can be detected accurately without adverse effect of noises as it is sharp when instance of the readout signal that crosses over a slice level 4 is detected. In the example, detection at the trailing edge is made at higher accuracy. Therefore, shorter step width of the modulation at the time of information recording is more effective to record at high density. This makes it possible to set optimum step width depending on change sharpness (S/N) of the readout signal. It is therefore possible to make the recording density high at the highest efficiency.

Further, reproduction conditions for the leading edge and the ones for the trailing edge can be independently optimized in a way that the information corresponding to the leading edges can be made to reproduce at a scan time of a laser beam different from the one corresponding to the trailing edges or that direction of a readout magnetic field applied to around a light spot for detection of the information corresponding to the leading edges is changed for detection of the one corresponding to the trailing edges. This can increase the readout signal quality. For the purpose, it is preferable to use a medium having both the characteristics shown in FIGS. 2 and 5 for the directions of the readout magnetic field.

The optical recording device of the present invention for reproducing the recorded information from the optical recording medium has an optical head for irradiating a readout beam to the optical recording medium to form a light spot, a polarization detector for detecting an polarization state of a reflected light of the readout beam, a position servo system for moving the light spot to a desired position of the optical recording medium, and a selector for selecting only higher portion of a change rate of the readout signal with time than a certain value before detecting an instance of the portion. The selector can be formed of high-frequency detector and a comparator.

Such a construction of the optical recording device can accomplish sharp change rate of the readout signal, thereby increasing the signal quality (S/N). It also can reproduce smaller domain than the optical spot at high resolution, as it is possible to selectively reproduce only the portion of the domain shape changing in the optical spot.

The optical spot area can have a readout magnetic field applying means for applying a readout magnetic field thereto. This makes it easy to reproduce information at high S/N while the reproduction conditions are optimized.

The optical recording device may further have a controller for controlling direction of the readout magnetic field applied to the readout magnetic field applying means so that the controller can control the direction of the readout magnetic field to reverse on the basis of the information of instance detected by the selector. This makes it possible to reproduce information at the edges at high speed while the reproduction conditions for the leading edge and the ones for the trailing edge can be independently optimized.

The optical recording device may further have at least two sets of the optical head and the readout magnetic field applying means each. This makes it easy to reproduce information while the reproduction conditions for the leading edge and the ones for the trailing edge can be independently optimized. The device can make readout more stably.

As described so far, the present invention makes deformation (extinction, generation, or expansion) of the domain on the optical recording medium to cause sharp change of the area of the domain in the optical spot. The sharp change is reflected to the readout signal. Therefore, the optical recording method of the present invention can make the readout signal have the portions changing very sharply. The sharpest portion of the readout signal can be used effectively to accomplish the high-density recording and reproduction.

As the readout signal is sharp, possible superimposition of amplitude noises on the readout signal can be made less in effect on jitter (small, rapid fluctuation) of the readout signal. Therefore, the detection accuracy of the instance of change of the readout signal can be increased. The high detection accuracy of the instance of change of the readout signal means that the mark position and length on the recording medium can be detected accurately. That is, it is possible to reproduce information at high density.

To cause the area change of the domain, we should use a medium having a characteristic of sharp change of the recording domain diameter with temperature as shown in FIGS. 2 and 5. Such a medium can be obtained, for example, by making the magnetic layer multiple as shown in FIG. 19. The medium having the characteristic can achieve the sharp change of the readout signal as shown in FIGS. 1 and 6.

To detect the sharp change of the readout signal efficiently, we can use combination means of a differential circuit and slicing circuit for detecting only high-frequency components. The combination means can prevent detection of signal components that do not change sharply. This is effective to eliminate inter-track crosstalk and the like.

BRIEF DESCRIPTION OF THE DRAWINGS

FIG. 3 depicts a sketch and graph illustrating an embodiment of the optical readout method according to the present invention;

FIG. 4 depicts graphs illustrating an embodiment of the optical readout method according to the present invention;

FIG. 18 depicts a graph illustrating an embodiment of the optical readout method according to the present invention; and FIG. 19 depicts a partially cross-sectioned view illustrating an embodiment of the optical recording medium according to the present invention.

DETAILED DESCRIPTION OF THE PREFERRED EMBODIMENTS

Embodiment 1: Optical Recording Medium

Figure 1:
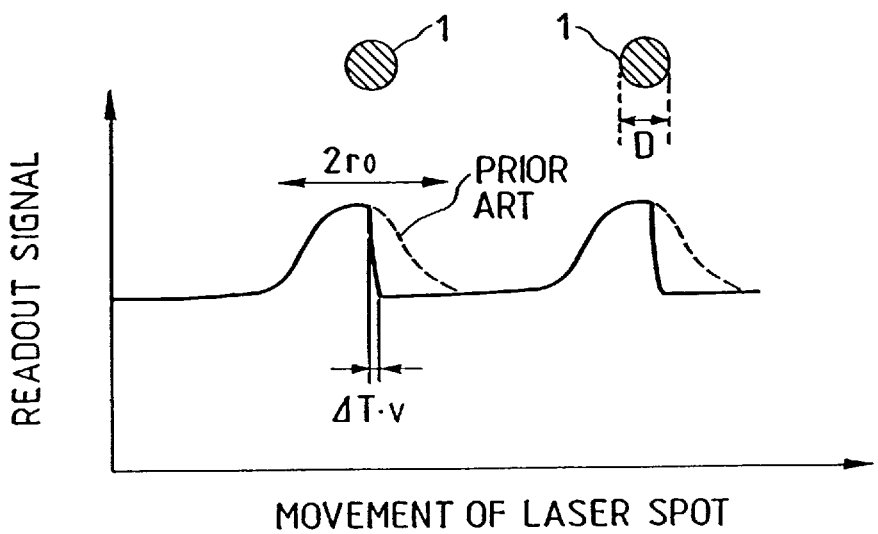
FIG. 1 depicts a graph illustrating an embodiment of the optical readout method according to the present invention.

FIG. 19 depicts a cross-sectioned view illustrating an embodiment of the optical recording medium 6 according to the present invention. A disk-like substrate 13 having grooves of 0.8 μm intervals has a SiN dielectric layer of 60 nm thick laminated thereon. The substrate 13 further has a first magnetic layer 51 of $Gd_{23}Fe_{59}Co_{18}$ of 40 nm thick having a low coercivity, second magnetic layer 52 of $Tb_{18}Dy_{10}Fe_{72}$ of 10 nm thick, and third magnetic layer 53 of $Tb_{28}Fe_{61}Co_{11}$ of 50 nm thick laminated in the sequence thereon to form a magnetic layer 50 by way of an rf magnetron sputtering method. Total thickness of the magnetic layer 50 therefore is 100 nm. The magnetic layer 50 further may have a dielectric protection layer, such as SiN, formed thereon as necessary. The optical recording medium 6 formed as described above was magnetized by applying stronger magnetic field than 25 KOe thereto. After this, the optical recording medium 6 was made to have domains of diameter $D_o$ of 0.35 μm to write in a way that it was subjected to irradiation of intense laser pulse of 15 mW and 20 nsec while having a bias magnetic field of 400 Oe applied thereto. After writing, as shown on a left side of FIG. 19, the domain of diameter Do was formed between the first magnetic layer 51 and the third magnetic layer 53.

Figure 2:
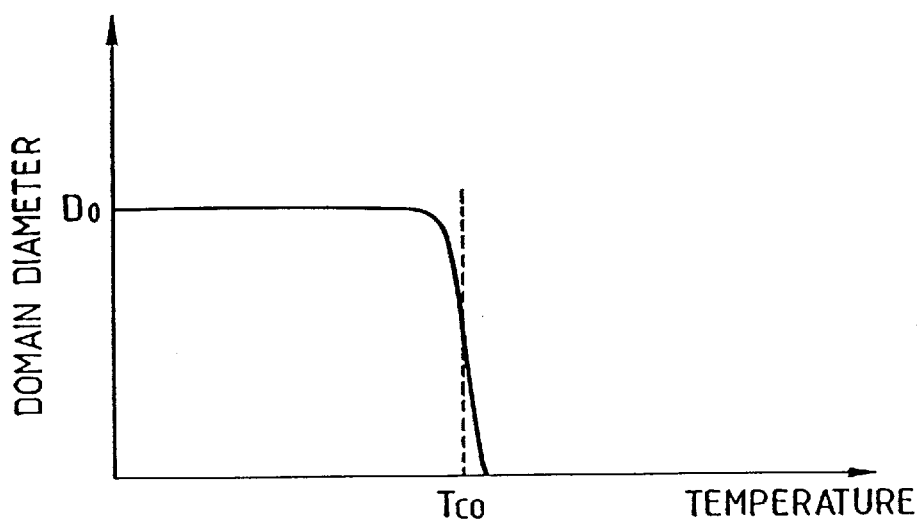
FIG. 2 depicts a characteristic graph illustrating an example of the optical recording medium according to the present invention.

The second magnetic layer 52 of the recording medium has as low a Curie temperature as 120° C. If the medium was heated to around the temperature while having a readout magnetic field Hr applied thereto, the magnetization of the second magnetic layer 52 was eliminated, and magnetizations of the first magnetic layer 51 and third magnetic layer 53 were decoupled magnetically. For the reason, as shown in FIG. 2, the domain diameter D of the first magnetic layer 51 having low coercivity was made small so quickly that the domain was collapsed. The collapsing temperature Tco was 105° C.

The second magnetic layer 52 is effective to control an exchange force between the first magnetic layer 51 and the third magnetic layer 53. But, the second magnetic layer 52 is not always needed.

Embodiment 2: Optical Recording Medium

The following describes in detail a second embodiment of the optical recording medium 6 for use in the present invention. The optical recording medium 6 was formed as described below.

A disk-like substrate 13 having concave pits of 0.25 μm diameter and 10 nm deep has a SiAlON dielectric layer of 50 nm thick laminated thereon. The substrate 13 further has a first magnetic layer 51 of $Gd_{13}Dy_8Fe_{61}Co_{18}$ of 25 nm thick having a low coercivity, a second dielectric layer of SiN of 15 nm thick, and a reflection layer of Al-Ti alloy of 60 nm thick laminated in the sequence thereon by way of an rf magnetron sputtering method. The substrate 13 further may have an organic protection layer coated thereon as necessary.

The optical recording medium 6 formed as described above was magnetized by applying stronger magnetic field than 25 KOe thereto to form domains of 0.25 μm diameter at the concave pits. In general, the magnetron sputtering method makes thin the layer thickness of the concave, changing the magnetic characteristic. In the second embodiment, as a result of the coercivity that was made slightly lower, a demagnetizing field from a periphery of each pit forms the domain automatically. The disk had a weak bias magnetic field of 150 Oe applied thereto in the same direction as the first embodiment and was heated while being observed through a microscope. The result of observation of the domain diameter at the pit is shown in FIG. 2. A collapsing temperature Tco at which the domain was collapsed was 125° C.

Embodiment 3: Optical Recording Medium

The following describes in detail a third embodiment of the optical recording medium 6 for use in the present invention. The optical recording medium 6 was formed as described below.

A disk-like substrate 13 having grooves has a SiON dielectric layer of 55 nm thick laminated thereon. The substrate 13 further has a first magnetic layer 51 of $Tb_{22}Fe_{72}Co_6$ of 25 nm thick, a second dielectric layer of SiN of 15 nm thick, and a reflection layer of Al-Ag alloy of 40 nm thick laminated in the sequence thereon by way of an rf magnetron sputtering method. The substrate 13 further may have an organic protection layer coated thereon as necessary.

Figure 5:
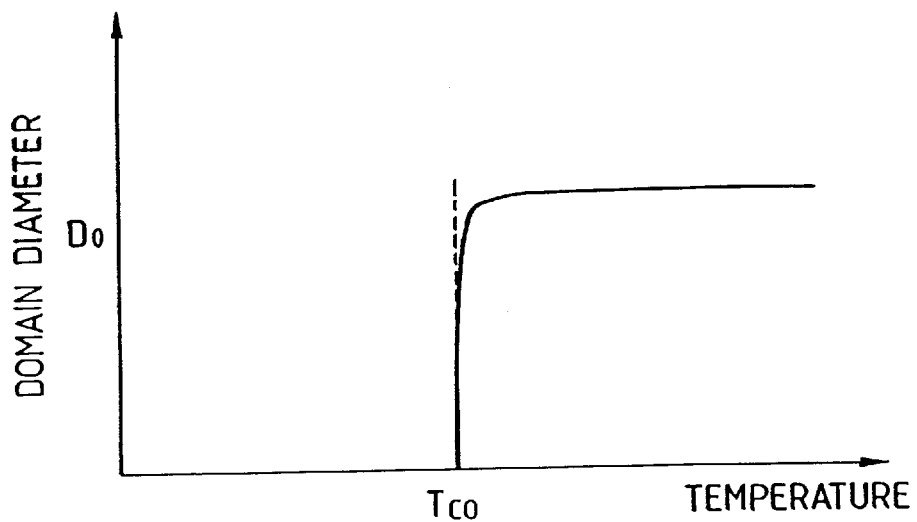
FIG. 5 depicts a characteristic graph illustrating an example of the optical recording medium according to the present invention.
Figure 6:
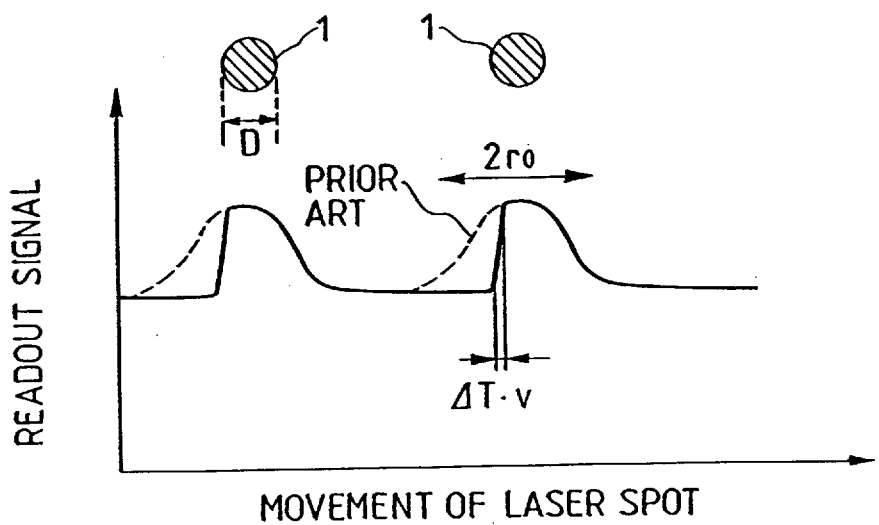
FIG. 6 depicts a graph illustrating an embodiment of the optical readout method according to the present invention.

The optical recording medium 6 formed as described above was changed in its magnetic characteristic at an area of 0.25 μm diameter to write information by use of a laser beam of 351 nm wavelength as strong as 15 mW. That is, the coercivity of the medium was made to decrease. It is thought that such a phenomenon that the coercivity was made to decrease by the strong laser beam is due to the fact that an amorphous state of the medium is relaxed structurally. The disk was magnetized by applying stronger magnetic field than 25 KOe thereto and had a bias magnetic field of 400 Oe applied thereto in an opposite direction. The disk was heated while domain diameters at pits thereof were observed through a microscope. The result of observation of the domain diameter is shown in FIG. 5. A temperature Tco at which the domain was generated was 140° C.

The third embodiment described is a ROM-type medium that writes information in advance by way of strong laser beam. The embodiment, of course, can be used as DRAW-type.

Embodiment 4: Optical Readout Method

The following describes in detail a fourth embodiment in which the optical readout method of the present invention is used in the optical recording medium 6 described in the first embodiment by reference to FIG. 3.

Left views in the figure are looked from the first magnetic layer 51 of the optical recording medium 6. In the upper left view, suppose a situation that an optical spot 2 was relatively moved into an area having a domain 1 formed therein in a direction of an arrow 3. The optical spot 2, as shown in FIG. 19, was formed by focusing the laser beam through a lens 7. Radius of the optical spot 2 was 0.6 μm as a wavelength thereof used was 680 nm and the a numerical aperture of the lens used was 0.55. The laser beam used was DC beam of 3 mW. The optical spot 2 was moved at a relative speed v of 1.2 m/sec to the medium. This forms behind the optical spot 2 in FIG. 3 an area having higher temperature T than the collapse temperature Tco. The area moves together with the optical spot 2.

Figure 16A:
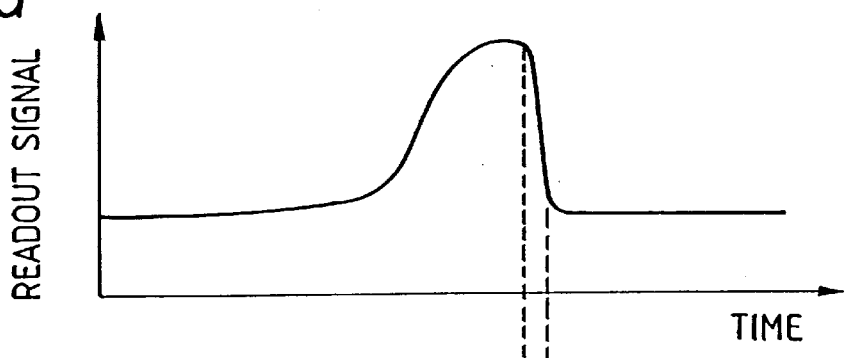
FIG. 16 depicts graphs illustrating principles of the optical readout method according to the present invention.
Figure 16B:
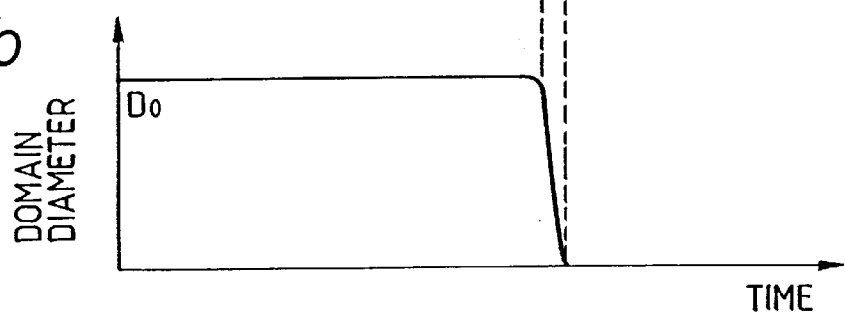

In the upper left state in FIG. 3, as the recorded domain 1 gradually comes to a center of the optical spot 2, the readout signal increases gradually. When the optical spot 2 comes to a position shown in the lower left view of the figure, the domain 1 is heated right to the collapse temperature Tco. With this, the recorded domain diameter D, as shown in the figure, becomes narrow sharply. At the same time as the domain collapses, the readout signal decreases abruptly (FIG. 16). Note that sign of the readout signal can be reversed from the ones in FIGS. 3 and 16 depending on the polarity of an amplifier of the optical recording device of the present invention.

Figure 10A:
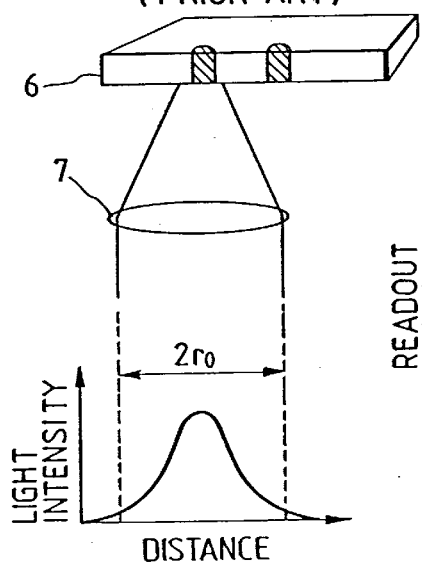
FIGS. 10(a) and 10(b) depict a simplified sketch and graphs illustrating a prior optical readout method.
Figure 10B:
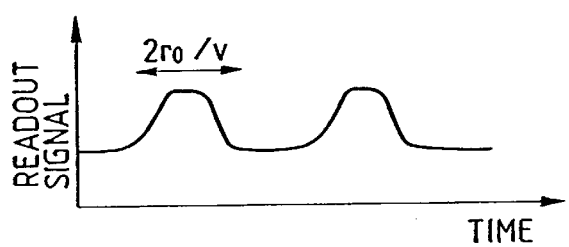
Figure 11:
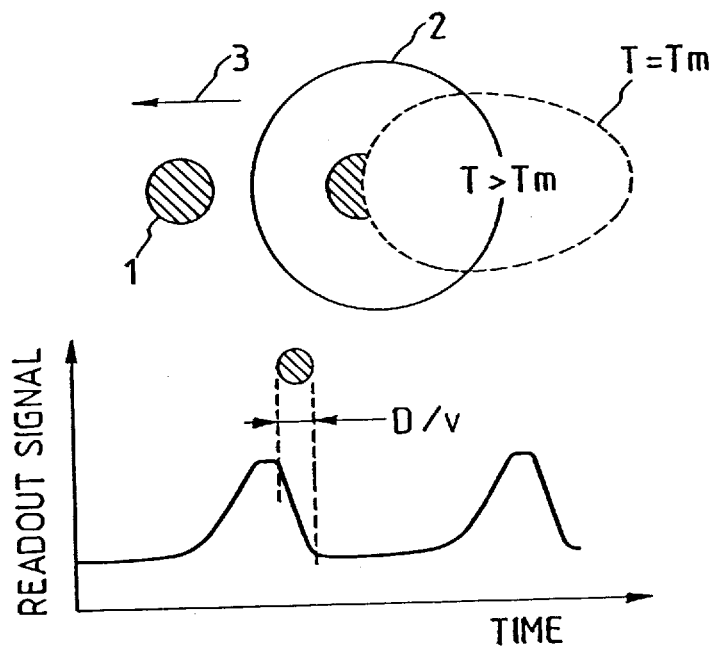
FIG. 11 depicts a sketch and a graph illustrating an example of the prior optical readout method.
Figure 12:
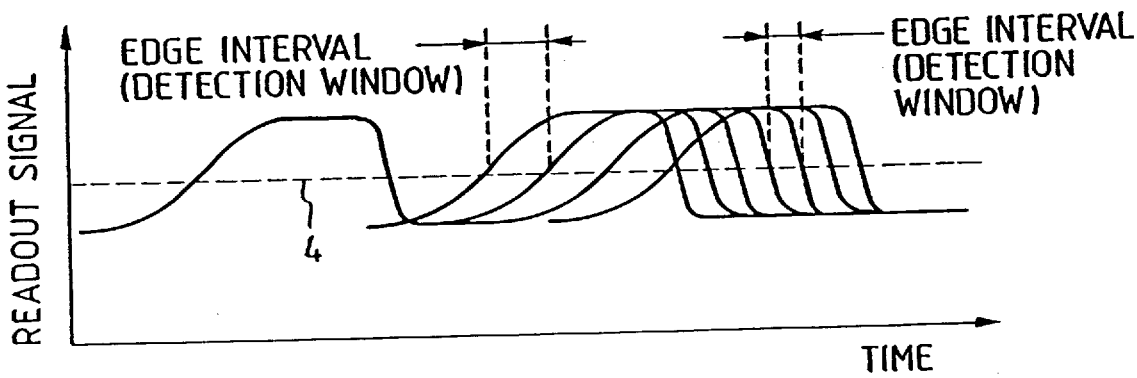
FIG. 12 depicts a graph illustrating an embodiment of the optical readout method according to the present invention.

For the reason, the change of the readout signal can be made sharper than the prior one having no collapse. In the fourth embodiment, the change time (rise time or trailing time) ΔT of the readout signal was 80 nsec. The movement of ΔT×v=0.096 μm shown in FIG. 1 is far shorter than the radius ro of the optical spot 2 and far shorter than the recorded domain of 0.35 μm. In other words, the readout signal in the fourth embodiment is made sharper than the prior ones shown in FIGS. 10 and 11.

Figure 17:
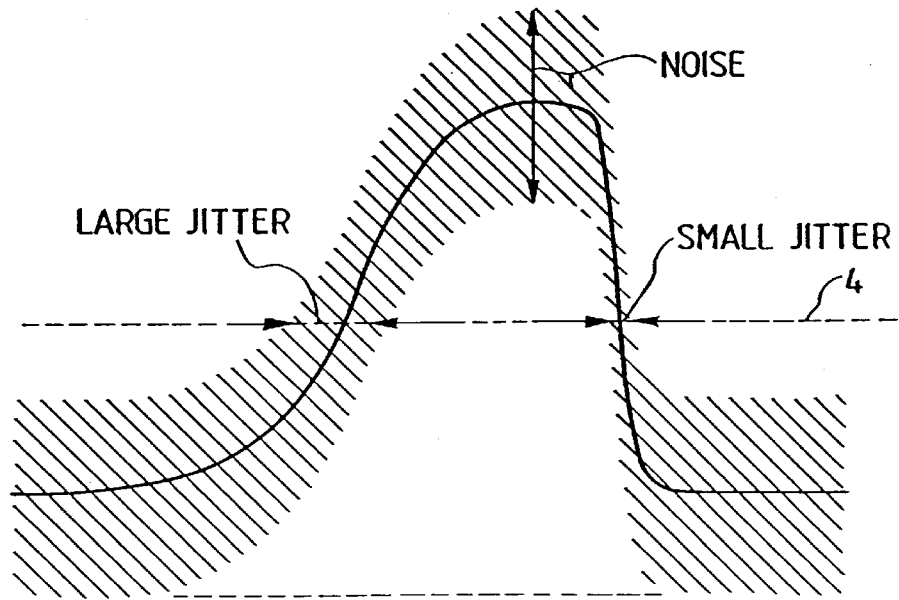
FIG. 17 depicts a graph illustrating principles of the optical readout method according to the present invention.

In turn, the following describes principles in which the sharp readout signal allows the position of the domain 1 to be detected at higher precision. Assume that as shown in FIG. 17, the readout signal is changed up and down by shot noises or the like. If the readout signal is not made sharper, jitter increases as shown at a leading edge of the noise in the figure. If the readout signal is made sharper, on the other hand, there occurs very little jitter as at a trailing edge of the noise in the figure. This means that it is possible to correctly detect an instance when the readout signal changes sharply. The instance of the sharp change of the readout signal is an instance when the recorded domain reaches right to the collapse temperature Tco. The device therefore can accurately detect presence or absence of the recorded domain at the position of the collapse temperature Tco in the optical spot.

On the contrary, by detecting only the sharp change of the readout signal, the device can detect only the information at the position of the collapse temperature Tco in the optical spot. The device therefore can detect smaller domain than the optical spot without interference. If the groove intervals are made narrower, of course, the device also can suppress occurrence of the crosstalk that the information of adjacent tracks mixes into the current one.

Amplitude of the noise in the fourth embodiment was ¼ of that of the readout signal; that is, SN of the readout signal was 12 dB. In that case, the jitter was around ¼ of ΔT; that is, the position of the recorded domain can be detected at an accuracy of 0.024 μm.

Figure 7:
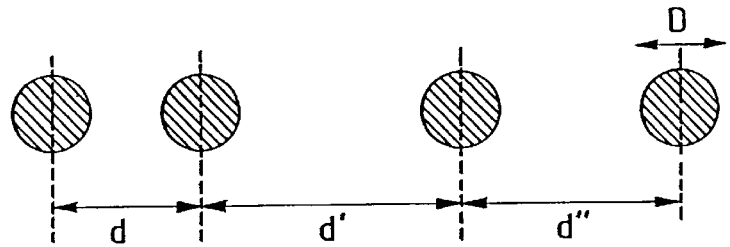
FIG. 7 depicts a sketch illustrating an embodiment of the optical readout method according to the present invention.

With the use of the performance that the position of the recorded domain can be detected accurately as described above, a high-density recording can be made if information is written in such a way as in FIG. 7. That is, let the intervals of the domain 1 be denoted by d. Then, d=do+Δ•n where do is a shortest mark interval, Δ is a step width, and n is 0, 1, 2, 3, and so on. As an example, a VFM modulation having do=0.6 μm was used. In the modulation, Δ=0.12 μm, n==0 to 18, and the bit density is 0.3 μm/bit. As the groove interval is 0.7 μm, the recording density is 3 Gb/in2.

Embodiment 5: Optical Readout Method

Figure 15:
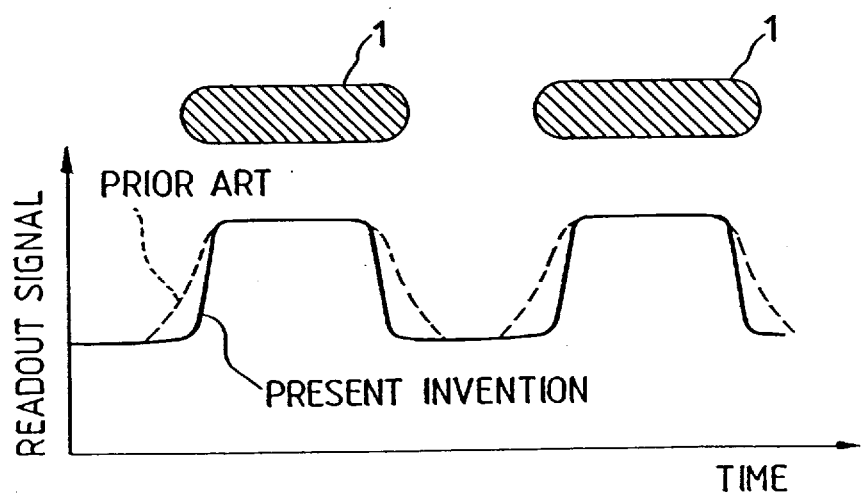
FIG. 15 depicts a graph illustrating an embodiment of the optical readout method according to the present invention.

FIG. 15 depicts a fifth embodiment in which the present invention is used in a mark edge recording. In the fifth embodiment was used the optical recording medium described in the first embodiment. For recoding information, the magnetic field modulation was used. This method of modulation is useful for the mark edge recording as it can write minute domains with a laser beam of relatively long wavelength. In the embodiment was used the NRZ edge recording with the laser beam of 680 nm wavelength, 0.5 μm width, and 0.3 μm shortest mark interval.

Readout of recorded information was made while a bias magnetic field was modulated in a real time way. That is, for detecting the leading edge, the bias magnetic field was modulated upward to read out. Right after detection of the leading edge, the bias magnetic field was reversed for preparation of detection of the trailing edge. As the readout magnetic field was changed at the times of detections of the leading and trailing edges, the device can obtain such a readout signal waveform having sharpness both at the leading and trailing edges as shown in FIG. 15. As the fifth embodiment uses the magnetic field modulation for recording, it can make overwriting easily.

Figure 9A:
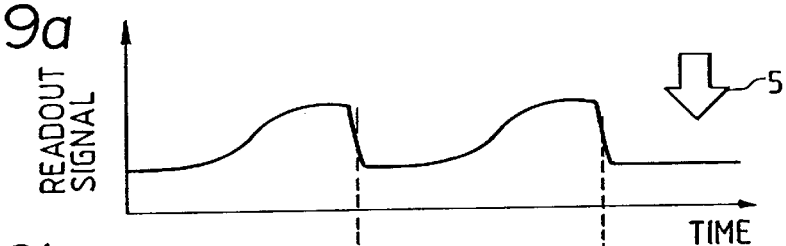
FIG. 9 depicts graphs illustrating an embodiment of the optical readout method according to the present invention.
Figure 9B:
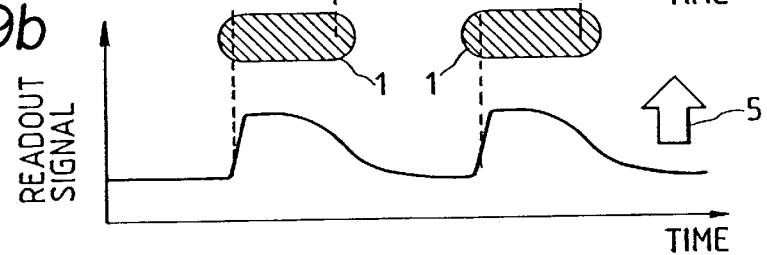
Figure 14:
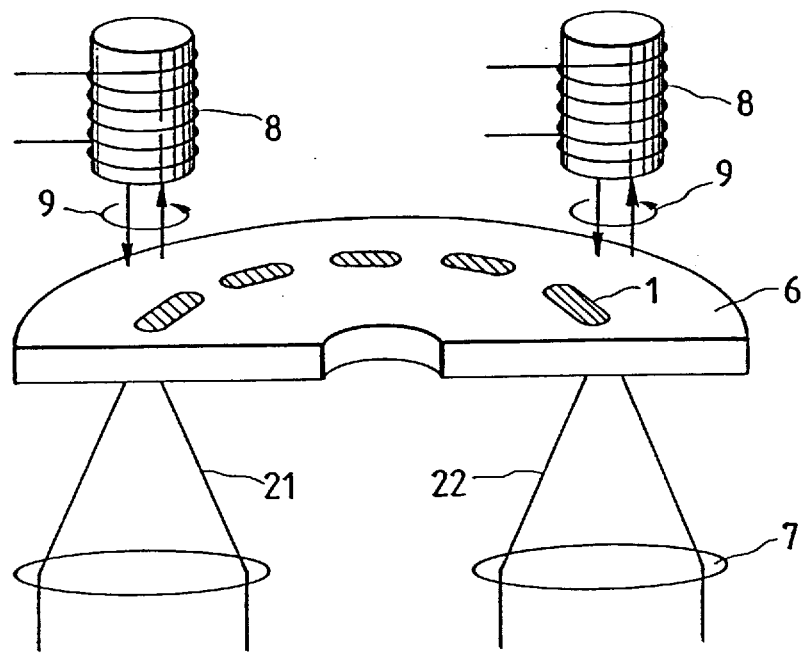
FIG. 14 depicts a sketch illustrating an embodiment of the optical recording device according to the present invention.

An alternative example of mark edge detection is a method shown in FIG. 14. In the method is used a light spot 21 for leading edge detection and a light spot 22 for trailing edge detection. For the light spots are used two sets of optical heads and readout magnetic field applying means 8 to read out the leading and trailing edges. Another alternative example of mark edge detection is a method shown in FIG. 9. In the method, a trailing edge is read out at a downward bias magnetic field in a first rotation, and a leading edge is read out at an upward bias magnetic field in a second rotation. In either of the methods, the mark edge recording can make high-density recording about 1.5 times as compared with the mark position recording in the second embodiment. That is, the mark edge recording can easily accomplish the higher density recording than 4 Gb/in2. The mark edge recording, however, needs more precise write control of the domain length.

Embodiment 6: Optical Recording Device

Figure 13:
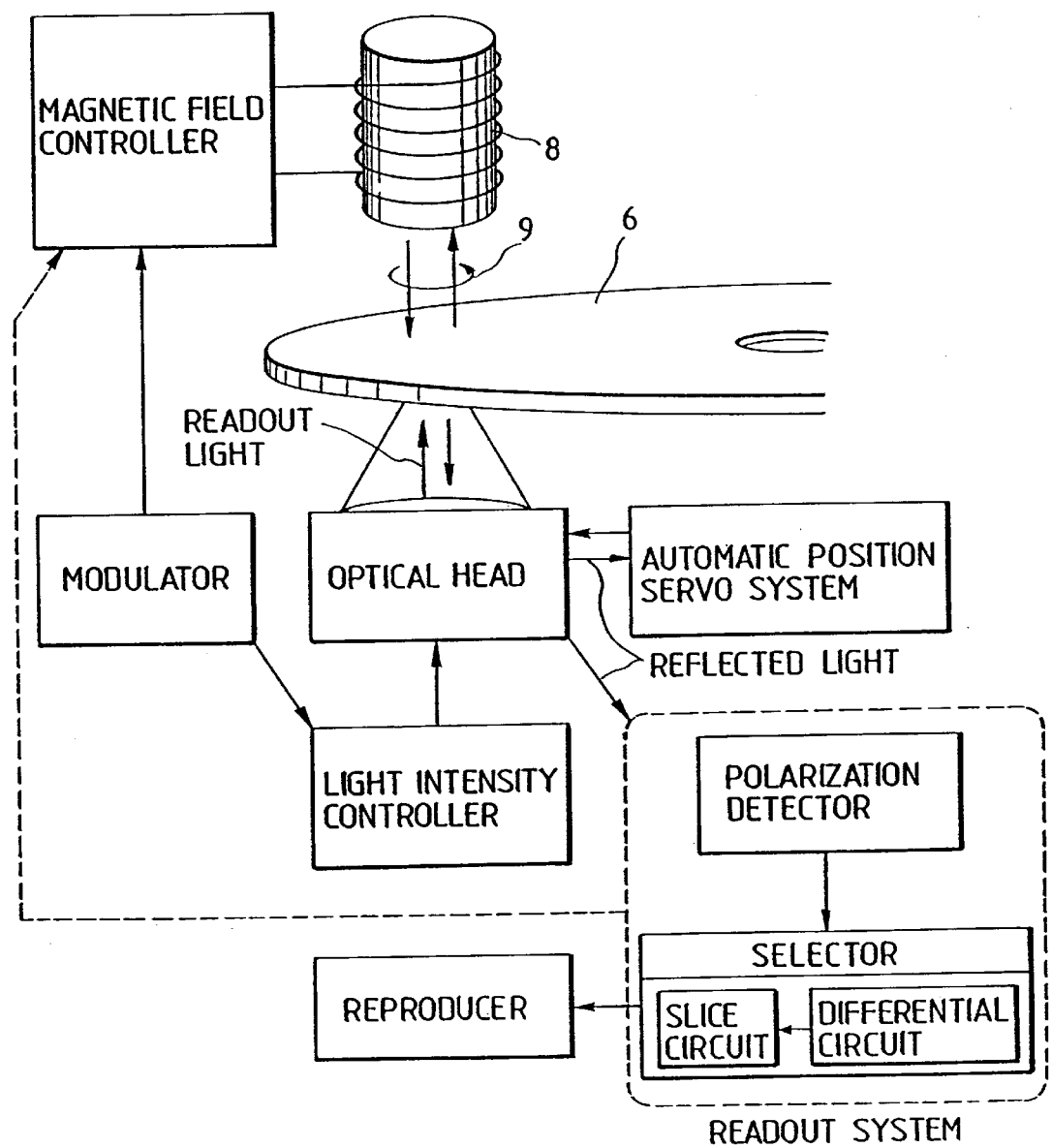
FIG. 13 depicts a block diagram illustrating an embodiment of the optical recording device according to the present invention.

FIG. 13 depicts a block diagram illustrating an optical recording device which is a sixth embodiment according to the present invention.

The optical recording device uses the optical recording medium 6 described in the first embodiment and has an optical head that can irradiate light to write on or read out of the optical recording medium 6. The optical head is positioned to an information writing or readout point by an automatic position servo system, including autofocusing and tracking means. To write the information, a modulator is used to modulate a light intensity and a magnetic field intensity depending on the informtion to be written. The optical recording device further includes a readout magnetic field applying means 8 and a readout magnetic field 9.

For readout, the light and the magnetic field are applied while the light intensity and the magnetic field intensity are controlled for quality readout. The optical recording device has a readout system, including a polarization detector, for detecting a polarization plane of a reflected light. The readout signal is led to a selector that differentiates the signal before slicing it so that only higher portion of the differentiative signal can be detected.

Figure 8A:
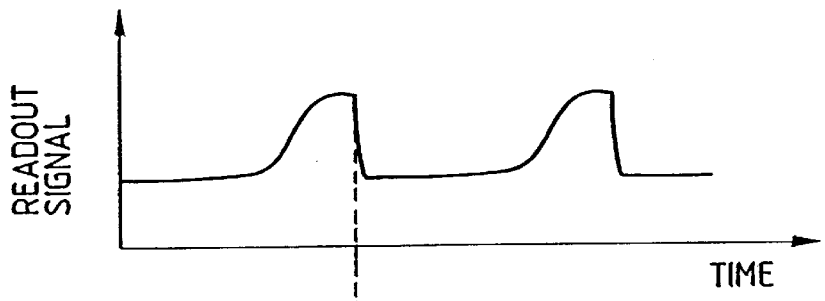
FIG. 8 depicts graphs illustrating an embodiment of the optical readout method according to the present invention.
Figure 8B:
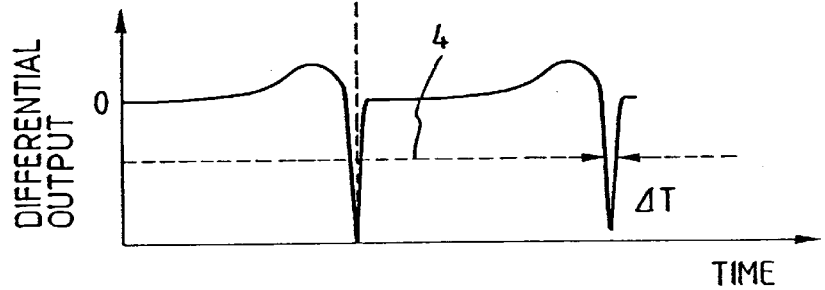

As shown in FIG. 8, the differentiated signal of the readout signal is sliced at a slice level 4. A sharp change ΔT of the readout signal can be selectively detected. Controlling the above-mentioned light intensity and magnetic field intensity can be made so simply that amplitude of the differentiated signal should be maximum.

In actual information reproduction, a clock signal 10 shown in FIG. 18 is generated on the basis of the readout signal. A reproduced signal 12 is obtained by making '1' and '0' correspond to whether or not the sharp change of the readout signal 11 is detected within a single period of the clock signal.

It will be understood that the present invention is not limited to the specific embodiments hereinbefore discussed. For example, the first magnetic layer 51 may be made of multi-layer of Pt and Co as the recording medium. The layers may be replaced by rareearth transition-metal alloys of other compositions, including GdFeCo, TbFeCo, DyFe, DyFeCo, TbDyFeCo, GdTbFeCo, NdFeCo, NdDyFeCo, NdTbFeCo, and GdCo. The recording medium may have an additional reflection layer or thermal diffusion layer. The recording medium may be shaped like a card.

As described so far, the present invention can accurately detect the recorded mark position without adverse effect by shot noise as the readout signal can be sliced because of the sharp change of the readout signal with time. The cross-talk from the adjacent tracks can be completely eliminated in the way that only the high-amplitude portion of the differentiated signal is selectively detected as the amplitude of the differentiated signal can be made high. At the same time, very small mark can be reproduced stably without interference. For the reason, the present invention can easily accomplish higher density recording than 3 Gb/in$^2$.

What is claimed is:

1. An optical readout method comprising the steps of:

providing an optical recording medium, comprising at least one magnetic layer on a substrate, the magnetic layer having a temperature Tco at which sizes of domains of the magnetic layer is sharply shrunk or expanded with temperatures;

irradiating the optical recording medium with a pulsed spot readout beam;

detecting a polarization state of a reflected light of the readout beam as a readout signal; and detecting an instance of sharp change of the readout signal that meets a relationship $$\Delta T < ro/v$$

where $\Delta T$ is the change time of the readout signal, ro is a radius of the readout beam spot, and v is a relative movement speed between the readout beam spot and the optical recording medium.

2. The optical readout method according to claim 1, wherein:

the information is recorded on the optical recording medium by changing distance between recording marks of virtually identical shape;

the distance between the recording marks is modulated by two or more discrete values with a step width;

the step width of the modulation is narrower than a half of a diameter of the recording marks of virtually identical shape; and the distance between the recording marks is detected as time intervals of the sharp change of the readout signal.

3. The optical readout method according to claim 1, wherein:

the information is recorded on the optical recording medium by changing both length of recording marks and distance between the recording marks; and the recorded information is reproduced by detecting instances of sharp changes of the readout signal corresponding to a leading edge of any of the recording marks and a trailing edge of the recording mark.

* * * * *

UNITED STATES PATENT AND TRADEMARK OFFICE
CERTIFICATE OF CORRECTION

PATENT NO. : 5,867,455
DATED : Feb 2, 1999
INVENTOR(S) : MIYAMOTO et al.

It is certified that error appears in the above-identified patent and that said Letters Patent is hereby corrected as shown below:

Col. 3, line 59, change "Fig. 4" to --Figs. 4A and 4B--;
Col. 6, line 22, change "Fig. 4" to --Figs. 4A and 4B--;
Col. 6, line 32, change "Fig. 8" to --Figs. 8A and 8B--;
Col. 6, line 34, change "Fig. 9" to --Figs. 9A and 9B--;
Col. 6, line 51, change "Fig. 16" to --Figs. 16A and 16B--;
Col. 6, line 55, change "Fig. 18" to --Figs. 18A, 18B and 18C--;
Col. 8, line 62, change "(Fig. 16)" to --(Figs. 16A and 16B)--;
Col. 8, line 63, change "16" to --16A & 16B--;
Col. 10, line 12, change "Fig. 9" to --Figs. 9A and 9B--;
Col. 10, line 46, change "Fig. 8" to --Figs. 8A and 8B--;
Col. 10, line 53, change "Fig 18" to --Fig. 18A--;
Col. 10, line 54, after "12", insert --shown in Fig. 18C--; and
Col. 10, line 56, after "11", insert --shown in Fig. 18B--.

Signed and Sealed this

Seventeenth Day of August, 1999

Attest:

Q. TODD DICKINSON

*Attesting Officer*                *Acting Commissioner of Patents and Trademarks*